April 10, 1962 J. E. WATKINS 3,029,354
LEVEL CONTROL AND INDICATING MECHANISM
Filed Jan. 8, 1958
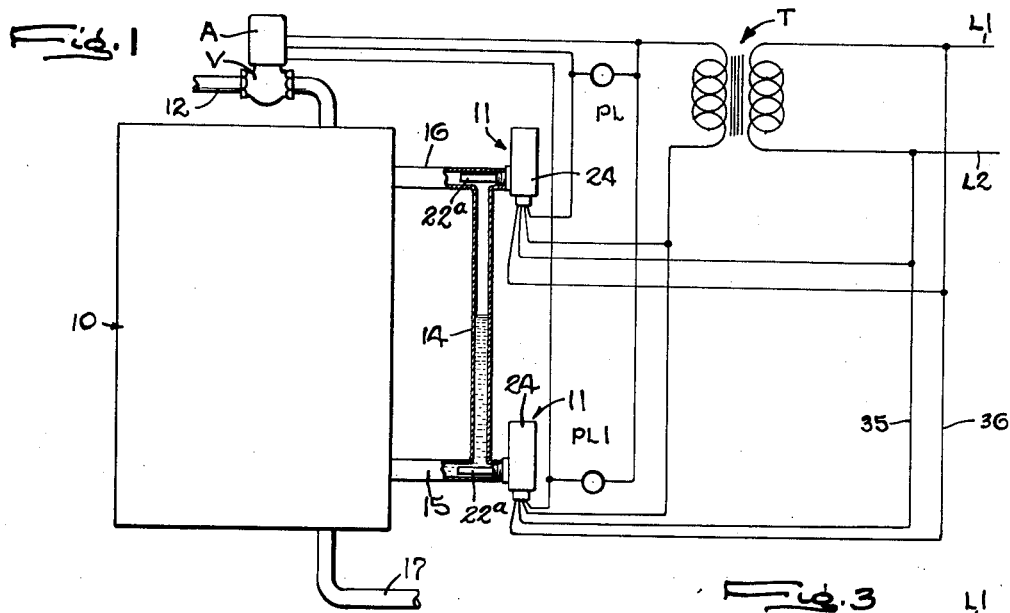
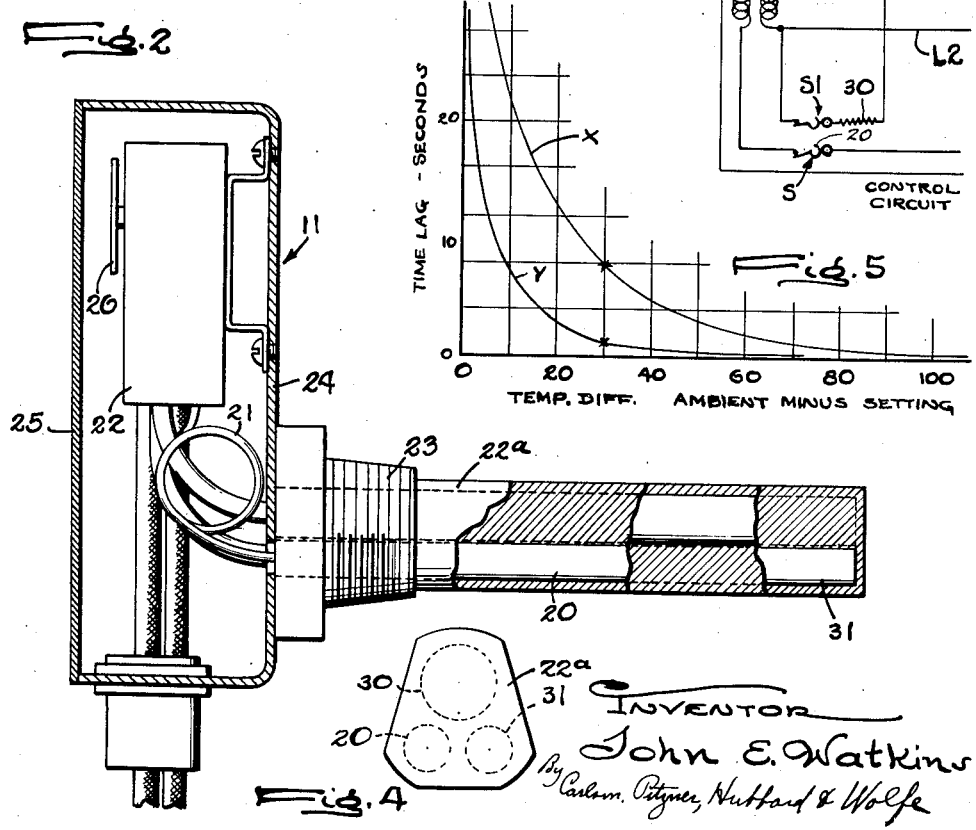
INVENTOR
John E. Watkins
By Carlson, Pitzner, Hubbard & Wolfe
ATTORNEY United States Patent Office 3,029,354
Patented Apr. 10, 1962

3,029,354
LEVEL CONTROL AND INDICATING
MECHANISM
John Edward Watkins, 307 Lake St., Maywood, Ill.
Filed Jan. 8, 1958, Ser. No. 707,753
3 Claims. (Cl. 307—117)

The invention relates to the control or indication of liquid levels in closed vessels and more particularly to the control or indication of the level of liquefied refrigerant gas or other relatively cold liquids.

One object of the invention is to provide a level indicating and control mechanism which is efficient and dependable in operation, which is simple and inexpensive to produce and which is substantially free of parts subject to wear or likely to get out of order in use.

A more specific object is to provide a temperature operated device of the above general character which is relatively quick acting and highly accurate in its response to liquid level changes.

Other objects and advantages of the invention will become apparent from the following detailed description of the preferred embodiment illustrated in the accompanying drawings in which:

FIGURE 1 is a partly diagrammatic view of a liquid level control and indicator embodying the features of the invention shown as applied to a liquid refrigerant storage vessel.

FIG. 2 is an enlarged side elevational view of a temperature sensing unit constituting a part of the level control and indicating system shown in FIG. 1.

FIG. 3 is a diagram showing the electrical connections to the sensing unit.

FIG. 4 is an end elevational view of the liquid contacting element of the sensing unit.

FIG. 5 is a graph illustrating the time-temperature response of the improved controls as compared with controls utilizing conventional equipment.

While a preferred form of the invention and one application of the improved control has been shown and will be described herein, it is not intended to limit the invention to the particular form shown. On the contrary, the intention is to cover all structures, modifications and adaptations, as well as variations in the mode of application falling within the spirit and scope of the invention as more broadly and generally characterized in the appended claims.

By way of illustration, the invention has been shown as installed in operative association with a liquid storage vessel 10 designed for the temporary collection and storage of liquefied refrigerant gas, although it will be understood that the invention is readily applicable to vessels for holding other liquids.

In the particular embodiment illustrated level sensing devices or units 11 constructed in accordance with the invention are installed for monitoring the liquid supply in the vessel at two different levels. Thus, one of the units 11 is installed near the bottom of the vessel and connected in a control circuit with an actuator A for a valve V interposed in an inlet conduit 12 through which liquid refrigerant is supplied to the vessel. The second unit 11, in this instance, is installed near the top of the vessel 10, and is also connected in circuit with the actuator A. The arrangement is such that when the liquid level in the vessel falls below the level at which the lower sensing element is installed, the valve V is opened to initiate the flow of liquid into the vessel. When the liquid accumulates in the vessel to the level of the upper sensing device, the valve V is closed to terminate the incoming flow of liquid.

In addition to their controlling function, the level sensing units 11 additionally operate signals, in this instance, visually indicating the conditions prevailing, such, for example, as the open or closed condition of the valve V. As herein shown, two such signals are provided, one comprising a pilot signal lamp PL adapted to be lighted when the valve V is closed, and the other constituting a pilot signal lamp PL1 adapted to be lighted when the valve V is open.

Indication of intermediate liquid levels is provided, in this instance, by a sight tube 14 of transparent material opening at its lower and upper ends to fittings 15 and 16 tapped into the side of the vessel 10 and communicating with its interior at appropriate levels. In the particular system illustrated, liquid refrigerant is discharged from the vessel 10 by way of an outlet conduit 17.

It will be understood that the installation shown and described above is merely exemplary and that one or any desired number of the temperature sensing units 11 may be provided according to the requirements of the particular liquid handling system involved. Furthermore, it will be understood that each of the units may be connected for controlling other combinations of valves and indicators or other control devices if desired.

In carrying out the invention, I provide a temperature responsive unit in the form of a switch operating thermostatic or temperature responsive device which is sufficiently rugged and dependable to meet the operating requirements of the usual commercial or industrial refrigerating installations. Thermostatic devices as conventionally made and operated are too slow in their response to temperature changes to provide the accuracy of control or indication required in refrigerating systems. I have overcome this difficulty by providing an improved temperature responsive unit utilizing a simple, rugged temperature sensing element positioned to sense the temperature of a medium normally at a relatively constant predetermined temperature but subject to sudden changes in temperature. In accordance with the invention, I associate with the temperature sensing element auxiliary heating means for maintaining its temperature substantially at a critical value while subject to normal conditions. More particularly, I provide an auxiliary heating unit associated with the temperature sensing element of the device and adapted to supply sufficient heat thereto to maintain the thermostatic device just below or just above the temperature at which it becomes effective to activate an associated control switch. Accordingly, upon a slight change in temperature induced by a change in liquid level in the vessel, the thermostatic device responds and operates the control switch with a minimum of delay. Switch operation may involve either the opening or closing of a set of switch contacts according to the functions to be performed by the switch.

While thermostatic devices of various types may be employed, I prefer to utilize a device having a sensing element 20 that may be located at a substantial distance from the associated switch S (FIG. 3) which it actuates upon temperature changes. The sensing element may thus be located in contact with the side of the vessel 10 or it may be positioned for direct contact with the liquid in the vessel. The latter arrangement is shown in FIG. 1 in which the sensing element 20 of the units 11 are inserted in the fittings 15 and 16 which are in communication with the vessel.

In the particular unit shown in FIG. 2, the sensing element 20 comprises a hollow bulb connected by a capillary tube 21 with the usual pressure responsive switch actuating means enclosed, in this instance, in a casing 22. It will be understood that the bulb and tube are filled with a fluid adapted to expand and contract in accordance with temperature changes in the bulb.

For convenience of mounting, the sensing element 20 is enclosed in a tubular shell or jacket 22a projecting from a threaded nipple 23 adapted to be screwed into the fittings 15 and 16. The nipple 23, as shown, is fixed to one wall of a housing 24 which encloses and protects the switch casing 22. The housing may be fitted with a cover 25 providing access to a dial indicator 26 by which the trip point of the thermostatic actuated switch system may be set selectively.

The auxiliary heating means preferably comprises an electrical resistance heater 30 disposed closely adjacent the sensing element 20 within the jacket 22a as shown in FIGS. 2 and 4. To provide for accurate regulation of the heat supply, energizing current for the heater is controlled by a switch S1 adapted to be actuated by a second thermostatic device including a sensing element 31 disposed in the jacket 22a in close association with the heater 30 and temperature sensing element 20. The sensing element 31 may also be a fluid filled bulb connected with the actuating mechanism for the switch S1 which, in this instance, is also enclosed in the casing 22. It will be understood, of course, that provision is made for accurately adjusting the trip point of the switch S1.

The exemplary control system shown in FIG. 1 is supplied with low voltage operating current from a transformer T receiving power from a line L1, L2. The switches S of the actuators 11 are connected in this circuit in controlling relation to the valve actuator A which may be of the solenoid or motor driven type as preferred. More particularly, the arrangement is such that closure of the switch S of the upper unit 11 incident to the liquid rising in the vessel 10 to the level of that unit is effective to close the valve V and interrupt the delivery of liquid to the vessel. The valve remains closed until the liquid level falls below the lower sensing device 11 whereupon its switch is closed to initiate the opening of the valve. Pilot lamps PL and PL1 are lighted alternatively to indicate the open or closed positions of the valves.

Current for energizing the auxiliary heating elements of the sensing units 11 is supplied in this instance directly from the line L1—L2 by way of conductors 35 and 36. The individual thermostatic switches S1, of course, control the current supply to the heating elements in accordance with the requirements of the system. In the above organization the upper sensing element is normally above liquid level and thus subject to ambient temperature. The control switch S of this unit is therefore associated with its temperature responsive actuator so that it tends to close upon a predetermined drop in temperature. The associated auxiliary thermostatic switch S1 is accordingly set to maintain a heat input from the heat element 30 just sufficient to maintain the control switch open at ambient temperature. When the cold refrigerant rises to the level of the sensing element 20, the reduction in temperature will thus bring about a quick closing of the control switch S with equally rapid closure of the valve V to avoid overfilling of the vessel.

The lower temperature sensing unit 11, in this instance, is normally subject to the temperature of the liquid in the vessel 10. Its switch S is therefore associated with the temperature responsive actuating mechanism so that the switch closes upon a rise in temperature. The associated auxiliary thermostatic switch S1 is therefore set to maintain a heat input to the sensing element 20 just short of the amount required to close the switch S. Rapid closing of the switch will thus take place when the temperature rises incident to the liquid in the vessel 10 falling below the level of the lower sensing element.

The average operating time for conventional thermostatic switch devices when subjected to sudden temperature changes of different degrees has been found to closely approximate the curve X shown in FIG. 5. Thus, when subjected to a temperature change of 30°, for example, operation of the associated switch lags by approximately 8 seconds. The time lag decreases slowly for greater temperature differentials but it increases very rapidly for smaller temperature differentials. It will be evident that where temperature differentials of less than 80–100 degrees are involved, conventional thermostats are obviously unsuited for precise liquid level control or indication.

In contrast with the above, it has been found that my improved temperature sensing device reduces switch operating time lag very substantially at all temperature differentials ordinarily encountered in practice as shown by the curve Y, FIG. 5. Thus, when the improved sensing device is subjected to a temperature change of 30°, the time lag in the operation of the control switch is less than two seconds. This small time lag is further reduced and switch operation becomes substantially instantaneous at temperature differentials of 70° or less. Even at temperature differentials as low at 10°, the improved device is capable of operating with a time lag of less than 3 seconds. Control or indication of liquid levels sufficiently precise for commercial operation is thus obtainable with inexpensive apparatus that has the additional advantage of being extremely rugged and durable.

I claim as my invention:

1. The combination with a thermally responsive device having an element positioned to sense temperature changes of a medium subject to temperature variations, a switch operatively associated with said element and adapted to be operated when the element is subjected to a predetermined critical temperature, an electrically operated auxiliary heater positioned to supply heat to said sensing element, and temperature responsive means having a heat sensing element positioned closely adjacent said first mentioned sensing element operable to control the operation of said auxiliary heater to maintain said first sensing element at a temperature differing from said critical temperature just sufficiently to prevent operation of said switch until the element is subjected to the critical temperature by the medium being sensed.

2. The combination with a thermally responsive device having an element positioned to sense the temperature of a medium subjected to changing temperatures, of a switch operatively associated with said sensing element and adapted to be operated when that element is subjected to a predetermined critical temperature, an auxiliary heating element supported closely adjacent said sensing element, and temperature responsive means disposed closely adjacent both of said elements operative to regulate the operation of said heating element to maintain the sensing element continuously at a temperature differing from said critical temperature just sufficiently to prevent the operation of the switch until the temperature of the medium reaches the critical value.

3. Means for controlling or indicating liquid levels in a vessel comprising, in combination, temperature responsive means including a first temperature sensing element positioned to sense the temperature at a selected level of said vessel, a control or indicating circuit, a first switch in said circuit normally operable by said sensing element a predetermined time after the temperature sensed by the element reaches a predetermined value, an electrically energized heating coil disposed closely adjacent said sensing element, a circuit including a second switch for energizing said heating coil, and a second temperature sensing element disposed closely adjacent said first sensing element operative to open and close said second switch to maintain the first sensing element sufficiently close to said predetermined temperature to substantially reduce the time required for operating the first switch after the first element senses said predetermined temperature.

(References on following page)

References Cited in the file of this patent

UNITED STATES PATENTS

| | | |
|---|---|---|
| 2,570,451 | Hottenroth | Oct. 9, 1951 |
| 2,619,566 | Mahoney | Nov. 5, 1952 |
| 2,667,178 | Fred et al. | Jan. 26, 1954 |
| 2,707,482 | Carter | Mar. 3, 1955 |
| 2,735,272 | Lange | Feb. 21, 1956 |
| 2,766,406 | Schwartzkopf | Oct. 9, 1956 |
| 2,861,159 | Seney | Nov. 18, 1958 |